Sept. 20, 1949.　　　　J. R. SABBIA　　　　2,482,292
QUICK DISCONNECT

Filed May 13, 1948　　　　　　　　　　2 Sheets-Sheet 1

INVENTOR.

BY Jerome R. Sabbia

M. B. Tasker
ATTORNEY

Sept. 20, 1949.         J. R. SABBIA            2,482,292
                        QUICK DISCONNECT
Filed May 13, 1948                          2 Sheets-Sheet 2

INVENTOR.
BY Jerome R. Sabbia
M. B. Tasker
ATTORNEY

Patented Sept. 20, 1949

2,482,292

UNITED STATES PATENT OFFICE 2,482,292

QUICK DISCONNECT

Jerome R. Sabbia, Bridgeport, Conn., assignor to United Aircraft Corporation of East Hartford, Conn., a corporation of Delaware Application May 13, 1948, Serial No. 26,902

6 Claims. (Cl. 244—122)

This invention relates to high speed aircraft and particularly to an improved mechanism for disconnecting the pilot's supply lines such as air and oxygen during emergency egress from an airplane.

In aircraft which are adapted to flying at high speeds and at extreme altitudes such as fighter planes, the pilot wears a "G" suit which must be supplied through a hose with air under pressure from a suitable supply source in the airplane. Oxygen must be supplied through another hose to the pilot's mask and various electrical connections must be established to heating coils in the pilot's suit, to his microphone, and to his headset. In an aircraft having an ejectable pilot's seat or in the event of any emergency exit it is important that means be provided to instantaneously release the pilot carried equipment from the aircraft supply lines.

A complete description of a quick disconnect mechanism as employed with an ejectable seat in a fighter type aircraft is disclosed and claimed in copending Patent application Serial No. 772,199, filed September 4, 1947. The present invention deals with a greatly improved quick disconnect mechanism of the general type disclosed in the aforementioned application.

It is therefore an object of this invention to provide an improved quick disconnect mechanism for pilot's supply lines which is extremely simple, reliable, and practically foolproof.

It is a further object of this invention to provide a quick disconnect mechanism of improved construction which permits easy separation of the supply lines which are part of the pilot's personal flight accessories from their connection to lines that are attached to the airplane structure.

These and other objects and advantages of the invention will become apparent from the following detailed description of one embodiment of the invention which is described herein and shown in the accompanying drawings.

In these drawings,

Fig. 4 is a perspective cross sectional view of Fig. 2, the section being taken in vertical plane through the electrical connection of the disconnect console.

Fig. 5 is a detail side elevation of the actuating lever.

Fig. 6 is a perspective view of the slotted locking cam element.

Figure 1:
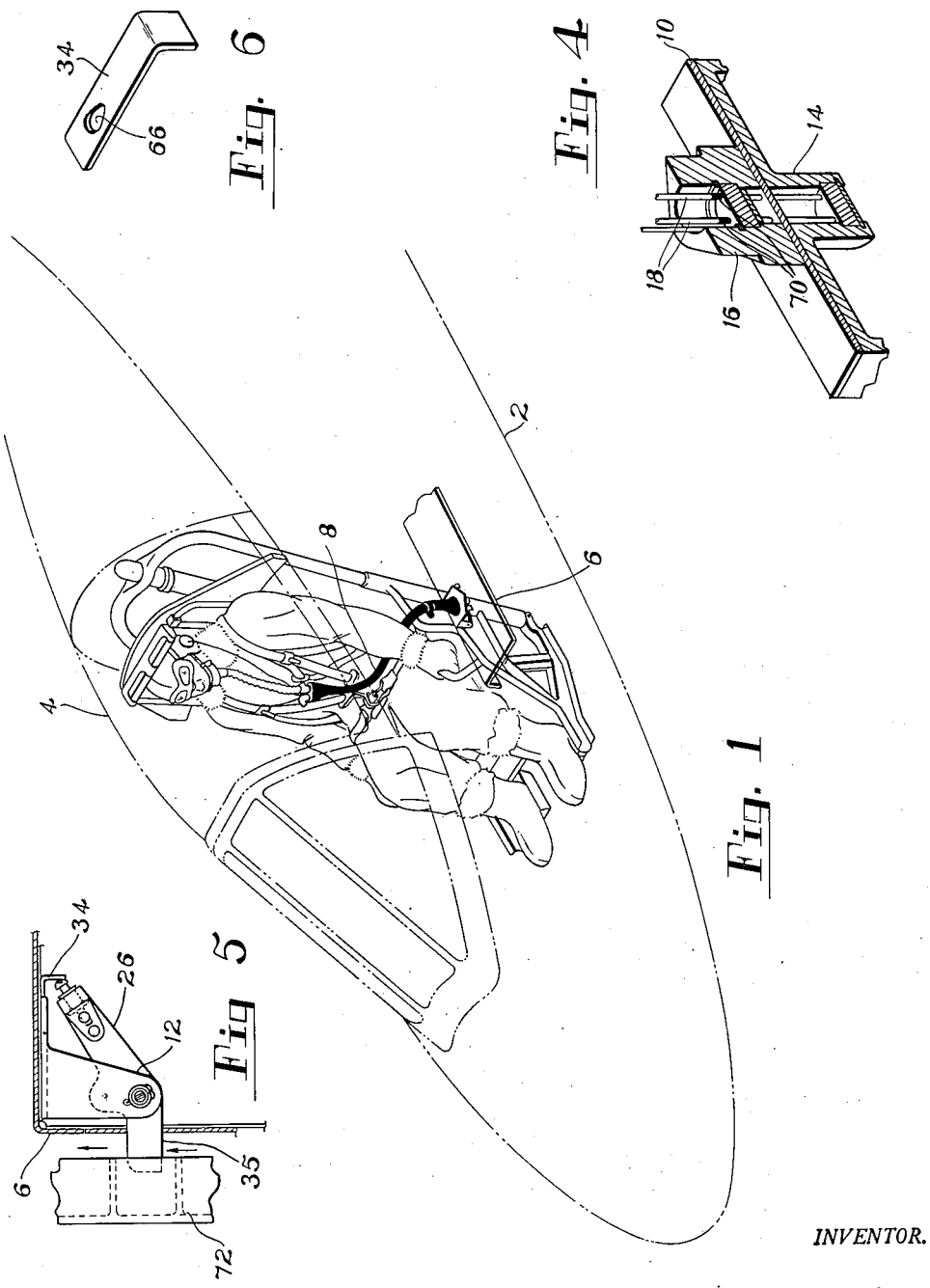
Fig. 1 shows the equipment normally worn by the pilot of a fighter aircraft, parts of the airplane being shown in phantom.

Fig. 1 generally indicates a portion of the fuselage 2 of a fighter aircraft in the vicinity of the pilot's compartment which is normally closed by a sliding canopy 4. The console 6 is located adjacent the pilot's seat and is fixed to the aircraft structure, the equipment in this console being connected to the pilot's personal flight equipment such as his "G" suit, oxygen mask, microphone, and headset by a flexible adapter 8.

Figure 2:
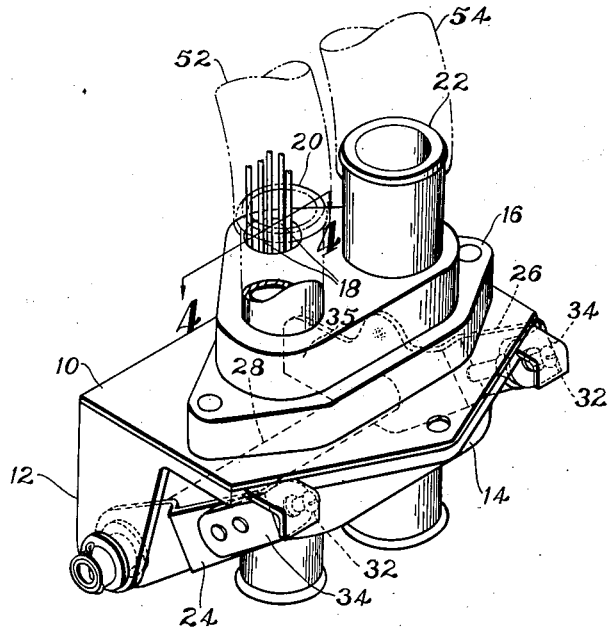
Fig. 2 is a perspective view of the quick disconnect console according to this invention.

The quick disconnect console shown in Fig. 2 consists of a base plate 10 having a pair of downwardly disposed legs 12 and a subcasing 14. A tiered pedestal 16 having an electrical connection 18 and fluid connections 20 and 22 is releasably attached to the base plate 10. A pair of parallel arms 24 and 26 are pivotally attached to the ends of the legs 12 by means of the shaft 28 which is disposed between and connected to the legs 12. The free ends of the arms 24 and 26 carry adjustable screw type cams 32 which cooperate with a cam element 34 in a manner which will be described hereinafter. The arm 26 is elongated at its pivoted end to form an actuating lever 35 which extends outwardly from beneath the base plate 10 thus providing a lever for rotating the arms 24 and 26. The actuating lever 35 may be moved by the pilot, or the lever may be interconnected to other emergency pre-ejection release mechanisms in the pilot's cockpit.

Figure 3:
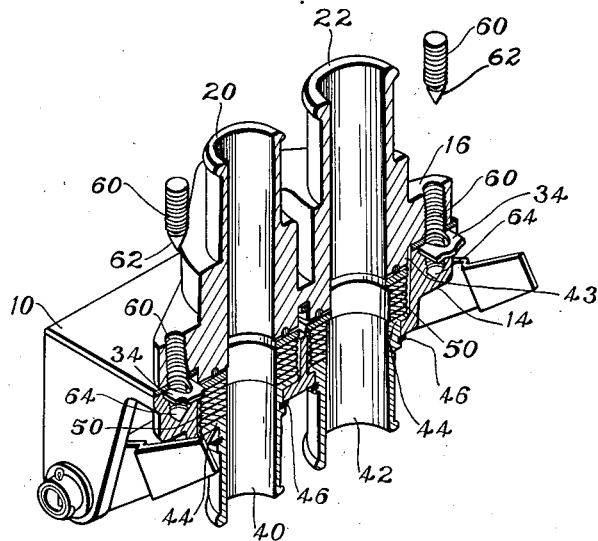
Fig. 3 is a vertical cross sectional view of Fig. 2 showing the fluid line connections in detail.

Referring to Fig. 3, the subcasing 14 which is integrally attached to the lower surface of the base plate 10 contains annular flanged apertures for housing the lower fluid connections 40 and 42. Cooperating flanges 44 on the connections 40 and 42 abut the flanges in the subcasing 14 and are held in position by lock rings 46. Bellows 50 of suitable material are positioned to fit the periphery of the annular apertures of subcasing 14 and have their lower surfaces abutting the flanges 44 of the connections 40 and 42. Upper fluid fittings 20 and 22 are normally snugly attached to the pedestal 16 since the integral collars 43 on the fittings mate with complementary surfaces within the pedestal. The lower surfaces of the fittings 20 and 22 abut the upper surface of the bellows 50 normally compressing them to form a fluid tight seal.

The pedestal 16 and the substantially integral fluid connections 20 and 22 are normally held in position against the base plate 10 by means of dowels 60. The dowel has a reduced step between the threaded section and the conical portion 62 and is rigidly attached to the pedestal 16 in such a way that the conical portion 62 protrudes sufficiently to communicate with drill passages 64 in the base plate 10 and the integral subcasing 14. The conical portion of the dowel 60 is designed to communicate with the tapered slot 66 in the L-shaped cam element 34 (Fig. 6) which has its longer leg disposed in a kerf between the mating surfaces of the base plate 10 and the subcasing 14.

The conical portion 62 of the dowel 60 can easily fit through the large end of the slot 66 in the cam element 34. However when the pedestal 60 is in proper position on the base plate 10, the cam element 34 can be moved toward the dowel 60 so that the smaller end of the tapered slot 66 straddles and engages the reduced portion of the dowel 60 thereby locking it in position. When in the open position, i. e., with the larger portion of the slot 66 engaging the dowel 60, it is possible for the pedestal 16 and the attached connections 20, 22 and the receptacle 18 to be released from the base plate 10.

Fluid supplies from sources in the airplane are normally directed to the connections 40 and 42. The connections 20 and 22 are in turn connected via the adapter 8 to the pilot's personal equipment by means of flexible hoses in order to provide him with the fluid when desired.

The electrical connection 18 has a plurality of jacks 70 (Fig. 4) which protrude from the bottom of the pedestal 16 and communicate with cooperating sockets in the subcasing 14. The jacks 70 having a friction fit in the sockets of the subcasing 14 are easily detachable from the latter, hence they can be readily released when the pedestal 16 is withdrawn from the base plate 10. The upper portion of the connection 18 leads through the adapter 8 to the pilot's headset, microphone, etc.

Thus it can be seen that during emergency exit the actuating lever 35 (Fig. 5) can be manually or semi-automatically rotated clockwise by a member 72 or similar device which is interconnected with other emergency pre-ejection release mechanisms in the cockpit, thereby similarly rotating the arms 24 and 26. As a result, the cams 32 which are mounted adjacent the free ends of the arms 24 and 26 communicate with the short leg of the cam element 34 causing it to move away from the dowel 60. The larger portion of the slot 66 in the cam element 34 will then be in communication with the dowel 60 to permit the latter's removal from the passages 64. It is then apparent that the entire pedestal 16, including the fluid connections 52, 54, and the electrical receptacle 18, can easily be withdrawn from the console to permit rapid egress by the pilot in emergencies.

As a result of this invention it can be seen that an extremely simple and efficient quick disconnect mechanism has been provided to permit the rapid release of the pilot's fluid and electrical supply lines from the airplane structure.

It is also evident that due to the simplicity and rugged construction a fluid tight release mechanism has been provided which can be easily disconnected and wherein the possibility of malfunction has been minimized.

While only one embodiment of the invention has been shown, it is evident that various modifications and variations of the construction and arrangement of this invention can be made without departing from the scope of the invention.

I claim:
1. In a quick disconnect mechanism for releasably connecting pilot carried equipment with supply lines in an aircraft, a base rigidly attached to the aircraft and connected to said supply lines, a pedestal mounted on said base for interconnecting said supply lines to said pilot's equipment, cooperating detent means on said base and pedestal for releasably holding said base on said pedestal including a reciprocable latch member on said base, and cam mechanism carried by said base for releasing said detent means.

2. In a quick disconnect mechanism for releasably connecting pilot carried equipment with supply lines in an aircraft, a base rigidly attached to the aircraft and connected to said supply lines, a pedestal mounted on said base for interconnecting said supply lines to said pilot's equipment, cooperating detent means on said base and pedestal for releasably holding said pedestal on said base including a reciprocable latch member on said base and a cooperating latch engaging member on said pedestal, and pilot operated means for actuating said latch member to release said supply lines.

3. Quick disconnect mechanism for releasably connecting a pilot's equipment with fluid supply lines in an aircraft including a plate member carried by the aircraft having passages therein, a movable pedestal having aligned passages therein, cooperating tubular fittings carried by said plate member and said pedestal in said passages, said aligned fittings having their adjacent ends spaced apart in said passages in the assembled position of said plate member and pedestal, compressed bellows in the passages in said plate member abutting the adjacent ends of said fittings and forming a fluid tight seal therein, and means for releasably connecting said plate member and pedestal for holding the adjacent ends of said fittings in fluid sealing engagement with said bellows.

4. A quick disconnect for releasably connecting a pilot's equipment with supply lines in an aircraft including a base adapted to be mounted on the aircraft, a movable member, cooperating holes in said base and stepped dowels in said member for centering said base and member, cooperating fluid passages in said base and member, tubular fittings in said passages having their adjacent ends spaced apart in the assembled position of said base and member, a bellows in the space between said ends having a normal axial dimension greater than said space for forming a fluid tight seal therebetween, cam elements slidably mounted on said base having tapered surfaces cooperating with said dowels for releasably locking said member to said base, and cam operating means mounted on said base and cooperating with said cam elements to release said member from said base.

5. A quick disconnect mechanism for releasably connecting a pilot's equipment with supply lines in an aircraft including, a base adapted to be rigidly mounted on the aircraft, a movable member, cooperating holes in said base and stepped dowels in said member for centering said base and member, cooperating passages in said base and member, tubular fittings and an electrical receptacle in said passages, bellows in said passages between the adjacent ends of said fittings forming a fluid tight seal therein, said electrical receptacle including jacks protruding from said member and frictionally cooperating with sockets in said base, cam elements having tapered slots cooperating with said dowels for releasably locking said dowels to said base, and means for moving said cam elements to effect release of said dowels from said base.

6. In a mechanism for effecting a quick disconnect of a pilot's equipment with fixed supply lines in an airplane, a base rigidly attached to the airplane having upper and lower portions, a movable tiered pedestal on said base having upstanding tubular fittings forming passages therethrough, cooperating passages in said base having flanges adjacent the bottom of said lower portion, downwardly disposed flanged fittings attached to said base having their flanges abutting the upper surface of the flanges on said base, lock rings on said downwardly disposed fittings abutting the lower surface of the flanges on said base, bellows within the passages in said base normally compressed between the adjacent ends of said upstanding and downwardly disposed fittings forming a fluid tight seal, cams carried by arms pivotally connected to said base, stepped dowels connecting said base and pedestal, and cam following elements slidably attached to said base cooperating with said cams and dowels to releasably lock said tiered pedestal to said base.

JEROME R. SABBIA.

REFERENCES CITED

The following references are of record in the file of this patent:

UNITED STATES PATENTS

| Number | Name | Date |
|---|---|---|
| 2,331,309 | Curriston | Oct. 12, 1943 |

FOREIGN PATENTS

| Number | Country | Date |
|---|---|---|
| 501,203 | Great Britain | Feb. 20, 1939 |